UNITED STATES PATENT OFFICE.

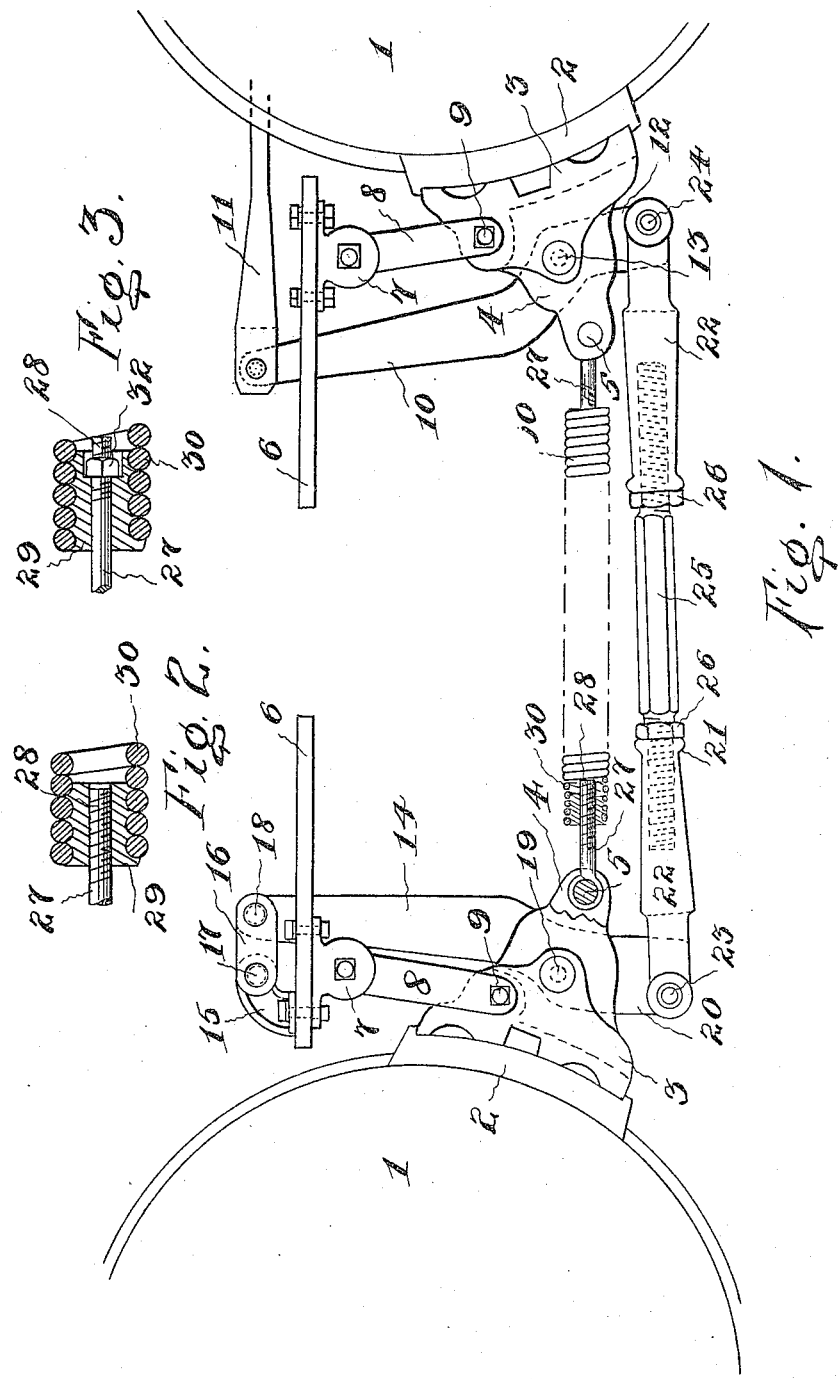

JAMES A. BROOKS, OF PHILADELPHIA, PENNSYLVANIA, ASSIGNOR TO THE J. G. BRILL CO., OF PHILADELPHIA, PENNSYLVANIA, A CORPORATION OF PENNSYLVANIA.

BRAKE MECHANISM FOR CAR-TRUCKS.

1,169,457. Specification of Letters Patent. Patented Jan. 25, 1916.

Original application filed June 7, 1912, Serial No. 702,143. Divided and this application filed February 27, 1913. Serial No. 750,989.

*To all whom it may concern:*

Be it known that I, JAMES A. BROOKS, a citizen of the United States, and residing in the city of Philadelphia, county of Philadelphia, and State of Pennsylvania, and whose post-office address is care of The J. G. Brill Company, Sixty-second street and Woodland avenue, in said city, have invented certain new and useful Improvements in Brake Mechanism for Car-Trucks, of which the following is a specification.

My invention has relation to improvements in a brake mechanism for use on car trucks, especially electrically propelled trucks, shown in my Patent, No. 1,071,694, dated September 2, 1913, of which this application is a division; and it consists in the combination of elements and their equivalents as hereinafter described and claimed.

Referring to the drawings appended hereto: Figure 1 is a side elevation of a portion of a car truck, partly in section, showing the essential portions of my improved brake mechanism. Fig. 2 is an enlarged sectional elevation of the spring bearing block showing the connection of the release spring and the connecting rod thereto; and Fig. 3 is a like view of a modification of the connection.

The improvements herein described relate more particularly to what are known as inside-hung brake shoes. Any conventionally or otherwise desirably constructed truck may be used.

At 1 are shown the wheels, 2 are the brake shoes, each shoe being provided with a head or carrier 3, having a bifurcated lug or projection 4, the extreme ends of which carry pins 5.

At 6 are the truck gusset plates. Underneath the gusset plates are blocks 7 to which are secured paired links or hangers 8, the lower ends of which pivotally engage bolts 9 passing through the brake heads 3.

At 10 is the live lever, the upper end of which is secured to a brake rod 11 leading to the source of power and which passes through the bifurcated extension 4 of the brake head, its lower end 12 projecting below the same. The live lever is pivoted to the brake head by the bolt 13.

At 14 is the dead lever.

At 15 is an upwardly extending curved bracket secured to the gusset plates or transoms.

At 16 are paired links pivotally secured to the bracket by a bolt 17. The outer ends of these links carry a bolt 18 to which is secured the upper end of the dead lever, which latter passes through the bifurcated extension 4 of the brake head, it being pivoted or fulcrumed to the brake head at 19. Both live and dead levers pass through slots in the gusset plates. The lower ends 12 and 20 of the live and dead levers are secured together by the turnbuckle 21, comprising the sections 22, pivotally secured by bolts 23 and 24 to the lower ends of said levers, the sections being united by a bar 25 oppositely threaded into the sections 22. Jam nuts 26 may be used to maintain adjustment in the usual way.

The above arrangement organizes the brake apparatus into a convenient and accessible whole.

The usual release spring is dispensed with, and in its place I substitute a release spring extending between the brake heads or carriers so that the pull of the release spring will be almost direct and very positive. The release spring comprises bolts 27 pivoted to the bolts 5 secured to the extensions 4 of the brake heads, the threaded ends 28 of the bolts, engaging threaded apertures formed in spring heads or carriers 29, the outer surfaces of which are cast or so formed as to take the turns of a spiral spring 30, which frequently engages said carriers. Shortening or elongation of this spring device may be had by turning the spring 30 or heads 29 in the appropriate direction. The connection of the bolts with the spring carriers may be modified, as in Fig. 3, by causing the threaded ends 28 to pass through enlarged holes 31 in the carriers which form a recess for the reception of a nut 32 movable on the ends of the bolts, by means of which the desired adjustment can be had.

It is apparent that my various improvements can be embodied in structures specifically different from those herein disclosed without departing from the spirit of my invention.

What I claim is:

In a brake mechanism, the combination with oppositely disposed brake shoes, of hangers pivotally connected at their lower ends to the brake heads, a live lever, the upper end of which is connected to a brake rod, the lower end connected to and projecting through a brake head and extending below the same, a dead lever pivotally connected with the other brake head and extending below the same, paired links from which the dead lever is supported, extensions on the brake heads, a coil spring extending between said extensions and a turnbuckle connecting the lower ends of the live and dead levers below the brake heads and being parallel with the coil spring.

Signed at the city of Philadelphia, county of Philadelphia, and State of Pennsylvania, this 19th day of February, 1913.

JAMES A. BROOKS.

Witnesses:
HENRY C. ESLING,
H. F. McKILLIP.